United States Patent
Thomas et al.

(10) Patent No.: US 6,665,271 B1
(45) Date of Patent: Dec. 16, 2003

(54) SYSTEM FOR REAL-TIME PREDICTION OF QUALITY FOR INTERNET-BASED MULTIMEDIA COMMUNICATIONS

(75) Inventors: Stephen A. Thomas, Marietta, GA (US); David B. Decker, Atlanta, GA (US); Rui J. P. de Figueiredo, Irvine, CA (US); John V. Martinez, Doraville, GA (US); James P. G. Dalton, Jr., Atlanta, GA (US)

(73) Assignee: TransNexus, LLC, Atlanta, GA (US)

( * ) Notice: Subject to any disclaimer, the term of this patent is extended or adjusted under 35 U.S.C. 154(b) by 0 days.

(21) Appl. No.: 09/270,978

(22) Filed: Mar. 17, 1999

Related U.S. Application Data

(60) Provisional application No. 60/078,289, filed on Mar. 17, 1998.

(51) Int. Cl.[7] .................................................. H04L 1/20
(52) U.S. Cl. ........................................ 370/252; 370/400
(58) Field of Search ................................ 370/252, 401, 370/352, 260, 231, 351, 237, 400, 470; 379/111, 115, 114, 220, 130, 112, 242; 709/104, 223

(56) References Cited

U.S. PATENT DOCUMENTS

| | | | |
|---|---|---|---|
| 4,726,056 A | 2/1988 | An et al. ..................... | 379/115 |
| 4,979,118 A | * 12/1990 | Kheradpir .................. | 701/117 |
| 5,155,763 A | * 10/1992 | Bigus et al. ................ | 379/111 |
| 5,185,780 A | * 2/1993 | Leggett ...................... | 379/111 |
| 5,251,152 A | * 10/1993 | Notess ....................... | 709/224 |
| 5,404,516 A | * 4/1995 | Georgiades et al. ........ | 709/104 |
| 5,408,465 A | * 4/1995 | Gusella et al. ............. | 370/231 |
| 5,434,848 A | 7/1995 | Chimento, Jr. et al. ...... | 370/17 |
| 5,473,630 A | 12/1995 | Penzias et al. .............. | 375/114 |
| 5,563,939 A | 10/1996 | La Porta et al. ............ | 379/220 |
| 5,570,417 A | 10/1996 | Byers et al. ................ | 379/115 |

(List continued on next page.)

FOREIGN PATENT DOCUMENTS

| | | |
|---|---|---|
| WO | WO 97/14236 | 4/1997 |
| WO | WO 97/23078 | 6/1997 |
| WO | WO 98/36543 | 8/1998 |
| WO | WO 99/14931 | 3/1999 |
| WO | WO 99/14932 | 3/1999 |

OTHER PUBLICATIONS

S.–K. Sin et al., A New Design Methodology for Optimal Interpolative Neural Networks with Application to the Localization and Classification of Acoustic Transients, IEEE Conference on Neural Networks for Ocean Engineering, 1991, pp. 329–340.*

(List continued on next page.)

*Primary Examiner*—Huy D. Vu
*Assistant Examiner*—Daniel Ryman
(74) *Attorney, Agent, or Firm*—King & Spalding, LLP

(57) ABSTRACT

Predicting the quality of a communication carried via a distributed computer network, such as the global Internet, before the initiation of that communication between a pair of endpoints. A prediction system comprises software-implemented processes that can be implemented within an Internet gateway or in an external system that provides prediction results to an Internet gateway. A first process accepts historical data and current environment data and, in response, generates a prediction of objective performance characteristics. A second process accepts the objective performance characteristics and, in response, generates an estimate of the expected quality of communications with an end user. This user quality estimate can be used to support a determination of whether to proceed with the communication or to rely upon an alternative to computer-network supported communications.

15 Claims, 6 Drawing Sheets

U.S. PATENT DOCUMENTS

| | | | | |
|---|---|---|---|---|
| 5,581,544 A | * | 12/1996 | Hamada et al. | 370/253 |
| 5,600,794 A | * | 2/1997 | Callon | 709/241 |
| 5,606,602 A | | 2/1997 | Johnson et al. | 379/115 |
| 5,633,919 A | | 5/1997 | Hogan et al. | 379/115 |
| 5,638,433 A | | 6/1997 | Bubien, Jr. et al. | 379/130 |
| 5,668,955 A | | 9/1997 | deCiutiis et al. | 379/130 |
| 5,675,636 A | | 10/1997 | Gray | 379/114 |
| 5,712,907 A | | 1/1998 | Wegner et al. | 379/112 |
| 5,790,642 A | | 8/1998 | Taylor et al. | 379/112 |
| 5,799,072 A | | 8/1998 | Vulcan et al. | 379/114 |
| 5,892,753 A | * | 4/1999 | Badt et al. | 370/233 |
| 5,898,668 A | * | 4/1999 | Shaffer | 370/230 |
| 5,898,673 A | * | 4/1999 | Riggan et al. | 370/237 |
| 5,917,891 A | * | 6/1999 | Will | 379/88.03 |
| 5,917,897 A | | 6/1999 | Johnson et al. | 379/114 |
| 5,917,902 A | | 6/1999 | Saucier | 379/242 |
| 5,943,657 A | | 8/1999 | Freestone et al. | 705/400 |
| 5,966,427 A | | 10/1999 | Shaffer et al. | 379/1 |
| 5,991,373 A | * | 11/1999 | Pattison et al. | 379/93.17 |
| 5,995,554 A | * | 11/1999 | Lang | 370/470 |
| 6,005,925 A | | 12/1999 | Johnson et al. | 379/114 |
| 6,005,926 A | | 12/1999 | Mashinsky | 379/114 |
| 6,049,531 A | | 4/2000 | Roy | 370/360 |
| 6,067,287 A | * | 5/2000 | Chung-Ju et al. | 370/232 |
| 6,128,280 A | * | 10/2000 | Jamoussi et al. | 370/230 |
| 6,128,304 A | | 10/2000 | Gardell et al. | 370/401 |
| 6,137,869 A | * | 10/2000 | Voit et al. | 379/114.01 |
| 6,178,510 B1 | | 1/2001 | O'Connor et al. | 379/201 |
| 6,205,211 B1 | | 3/2001 | Thomas et al. | 379/114 |
| 6,229,804 B1 | | 5/2001 | Mortsolf et al. | 370/352 |
| 6,240,449 B1 | | 5/2001 | Nadeau | 709/223 |
| 6,304,551 B1 | * | 10/2001 | Ramamurthy et al. | 370/232 |
| 6,339,595 B1 | * | 1/2002 | Rekhter et al. | 370/392 |

OTHER PUBLICATIONS

Thom, "H.323: The Multimedia Communications Standard for Local Area Networks," IEEE Communications Magazine, Dec. 1996, pp. 52–56.*

Johannesson, N.O., "The ETSI Computation Model: A Tool for Transmission Planning of Telephone Networks," IEEE Communications Magazine, vol.: 35 Issue: 1, Jan. 1997, page,(s): 70–79.*

("A New Design Methodology for Optimal Interpolative Neural Networks with Application to the Localization and Classification of Acoustic Transients," IEEE Conference on Neural Networks for Ocean Engineering, 1991, pp. 329–340.*

Thom, "H.323: The Multimedia Communications Standard for Local Area Networks," IEEE Communications Magazine, Dec. 1996, pp. 52–56.

Rudkin, et al., "Real–time applications on the Internet," BT Technology Journal, vol. 15, No. 2, Apr. 1997, pp. 209–225.

The Ascend Max Voice Gateway, XP–002096239, "The asnet pipeline," www.asnet.co.nz/pipeline/sum97/tam-vg.html, Mar. 11, 1999.

Hansson, et al., "Phone Doubler—A step towards integrated Internet and telephone communities," Ericsson Review No. 4, 1997, pp. 142–151.

* cited by examiner

SYSTEM FOR REAL-TIME PREDICTION OF QUALITY FOR INTERNET-BASED MULTIMEDIA COMMUNICATIONS

RELATED APPLICATION

This application is directed to subject matter originally presented in U.S. Provisional Patent Application Ser. No. 60/078,289, filed Mar. 17, 1998, and claims the benefit of priority for this provisional application under 35 U.S.C. 119(e).

TECHNICAL FIELD

The present invention is directed to a communications system for communicating voice, video or data over a distributed computer network, such as the global Internet. More particularly described, the present invention provides a system for predicting, in real time, the quality of multimedia communications over the Internet.

BACKGROUND OF THE INVENTION

The Internet can support the communication of multimedia data, including voice, video and data communications, via a global network of distributed computers without relying on the Public Switched Telephone Network (PSTN). FIG. 1 is a block diagram showing one example of an Internet-based telephony service, which can be supported by a communications system 100. This implementation of the communications system 100 is described in more detail in U.S. patent application Ser. Nos. 09/154,564 (now U.S. Pat. No. 6,426,955) and 09/154,566 (now abandoned), which are assigned to the assignee for the present application and fully incorporated herein by reference. A user 112 in the United States places a telephone call to a party 124 in France. Instead of using the international long distance network, however, the user 112 makes a local call via a local telephone network 114 in the United States to an Internet telephony endpoint or gateway 116. The gateway 116 converts the user's voice-band communications to digital packets and transfers those packets across the Internet 118 to a peer gateway 120 located in France. The gateway 120 performs the reverse actions of the gateway 116, converting the digital packets back to voice-band communications and delivering them to the called party 124 through the local telephone network 112 in France.

Before such Internet-based telephony services can achieve widespread commercial success, however, they must be able to assure end users of an acceptable level of quality for their conversations. The public Internet at present relies on a packet-based technology to support the communication of information via a multi-point computer network. As such, this computer network cannot offer the same certainty of quality as the legacy telephone network. In general, Internet-based communications may encounter latency, variable delay, and packet loss. These factors, along with other network conditions, may detract from the quality of multimedia communications for an Internet-based telephony service. The Internet telephony industry has recognized that service quality is a major impediment to commercial success. Consequently, industry members have either proposed or adopted a variety of strategies to address the problem of providing an acceptable level of quality for Internet-based telephony communications.

For example, a distributor for Internet telephony services can offer its customers and suppliers the option of using a dedicated communication facility that connects directly to a private communication network. This approach bypasses the publicly available resources of the Internet, while providing a more controlled communications environment that can reduce the uncertainties associated with Internet-based communications. This private network approach is economically inefficient, however, because it requires dedicated links to the private network rather than a link to the nearest connection point for the public Internet. At present, these private network links only carry Internet telephony traffic while, in contrast, a general Internet connection can support access to the World Wide Web, electronic mail, file transfer, and other conventional distributed computer network operations.

Another approach to the provision of service quality by the Internet telephony industry is the use of a nationwide fiber backbone to provide Internet telephony services. A major communications carrier can tightly control the use of its nationwide fiber backbone, thereby ensuring a certain level of quality of communications carried by that network. This approach, however, is limited by the extent of the backbone network, which typically provides connections only to selected urban regions. In comparison to the existing global distributed computer network of the public Internet, the expansion of a single fiber backbone network to provide ubiquitous world-wide communications service is an impractical solution.

The Internet Engineering Taskforce has proposed a special communications protocol, the Resource Reservation Protocol (RSVP), which provides for the reservation of resources on the Internet. It will be appreciated that multimedia communications can be assured of a certain minimum quality if sufficient Internet sources are reserved in advance of those communications. To be effective, however, RSVP must be deployed in all devices in the path of such multimedia communications. Consequently, this approach requires a comprehensive upgrade of all current devices in the Internet, which is a less than a practical near-term solution for a desired quality level of Internet multimedia communications.

Another service quality approach, proposed by Cisco Systems, Inc., is the use of a proprietary technology based on weighted fair queuing to ensure the quality of Internet-based communications. For effective operations, components utilizing the weighted fair queuing technology must be deployed throughout the entire communications path. This approach requires provisioning the entire public Internet with equipment utilizing the weighted fair queuing technology, which is at present offered only by Cisco Systems. Consequently, the marketplace has not accepted this approach as a wide scale solution to the service quality issue for Internet telephony communications.

In view of the foregoing, there is a need to characterize communications across the public Internet rather than private networks. Moreover, there is a need to support a level of quality communications across multiple administered domains rather than a single domain. There is a further need for an Internet-based communications system that operates with existing Internet infrastructure without requiring a comprehensive upgrade of existing equipment. In summary, there is no present mechanism to quantitatively assess the impact of latency, variable delay, and packet loss factors on communications quality, nor is there a commercially feasible method of predicting those factors in advance of a particular communication. The present invention provides a novel and non-obvious technical solution that addresses both of these needs of the prior art.

SUMMARY OF THE INVENTION

The present invention provides a system for predicting the quality of a communication carried via a distributed computer network, such as the global Internet or a frame network, before the initiation of that communication between a pair or endpoints for a communication system. The inventive prediction system comprises software-implemented processes that can be installed within a gateway of an Internet telephony system or in an external system that provides prediction results to the Internet gateway. A first process accepts historical data and current environment data and, in response, generates a prediction of objective performance characteristics. A second process accepts the prediction of objective performance characteristics and, in response, generates an estimate of an expected quality of communications with a called party. This user quality estimate is typically used to support a determination of whether to proceed with the communication or to rely upon an alternative to a communication completed by an Internet telephony system.

The first process of the prediction system, which collects historical data components for prior communications, can rely upon different communication protocols to collect Internet communication measurements and environment attributes. The International Telecommunications Union (ITU) H.323-series protocols for multimedia communication can be used to complete a direct measurement of a round-trip time between communicating endpoints. The Internet Control Measurement Protocol (ICMP) supports the use of ICMP path probes during a multimedia communication to collect fine-grained network path information for that communication. The Border Gateway Protocol (BGP) can support the collection and recording of BGP peering information during a multimedia communication to discover coarse-grained network path information for that communication. For example, BGP peering information can be collected from the nearest transit autonomous system to support the extrapolation of coarse-grained path information for stub autonomous systems. Consequently, the first software-implemented process of the prediction system can use both fine-grained path information and coarse-grained path information as indicators of the quality of service for multimedia communications.

While historical data provides information about prior communications, current environment data defines information about a specific communication under consideration. The information for a potential communication typically includes the identities of the endpoints, the current time and date, the coarse-grained paths between the endpoints, and a single sample of round-trip delay from the initiating endpoint. The fine and coarse-grained path measurement systems described above can be used to support the collection of current environment data that represents an input to the first process of the prediction system.

The first software-implemented process of the prediction system, the objective performance prediction process, can be constructed by the combination of a genetic algorithm and a neural network. The genetic algorithm is typically used to select significant historical data, whereas the neural network supports the prediction of current performance for a communication. The genetic algorithm accepts historical data and current environment data and outputs relevant historical data. The genetic algorithm can be tuned to select historical data based on selection criteria comprising similarity of network paths, identity of endpoints and time/date information. The neural network accepts current environment data and relevant historical data and, in response, generates a prediction of objective performance for the communication. In particular, the neural network can be implemented by an optimal interpolative neural network that supports the prediction of current performance for a current or future communication based on significant historical data from previous communications.

The second part of the software-implemented process of the prediction system provides an estimate of the subjective user quality based on objective performance prediction. This estimation process can be implemented according to the calculations and algorithms described in ITU-T Recommendation G. 107 (December 1998), "The E-Model, a Computational Model for use in Transmission Planning," and ETSI Guide EG 201 377-1 V1.1.1 (1999–01), "Speech Processing, Transmission and Quality Aspects (STQ); Specification and Measurement of Speech Transmission Quality; Part 1: Introduction to Objective Comparison Measurement Methods for One-Way Speech Quality Across Networks." Alternatively, the estimation process can be implemented by a conventional neural network that determines a subjective quality of a communication, as perceived by a human user, based on objective measurements or predictions of fraction packet loss or round-trip delay. This neural network can include (1) inputs defined by the fraction of packets lost in each path direction and characterizations of round-trip delay and (2) outputs representing an estimate of subjective user quality.

The various aspects of the present invention may be more clearly understood and appreciated from a review of the following detailed description of the exemplary embodiments and by reference to the appended drawings and claims.

DETAILED DESCRIPTION OF THE EXEMPLARY EMBODIMENTS

Figure 1:
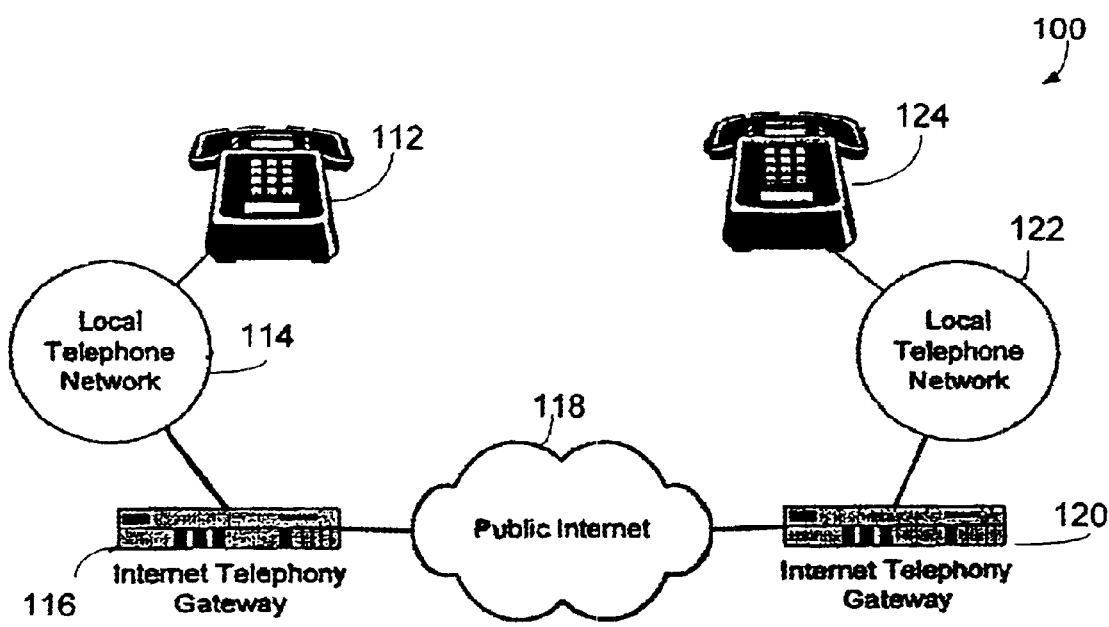
FIG. 1 is a block diagram illustrating the components of an Internet-based telephony service system.

The present invention can support a prediction of the quality of a communication carried via a distributed computer network, such as the global Internet, before that communication occurs. In the example of an Internet telephony communications system shown in FIG. 1, the inventive system can predict the expected quality of a voice conversation between the two parties. If the resulting prediction indicates an acceptable quality level, the communication can take place. If, however, the expected quality is too low, an advisory message can be generated and communication service operators can adopt contingency plans to assure the end users of satisfactory service. These optional plans may include, for example, offering the user a discount based on the expected quality, or re-routing the call over private networks or the PSTN.

Figure 2:
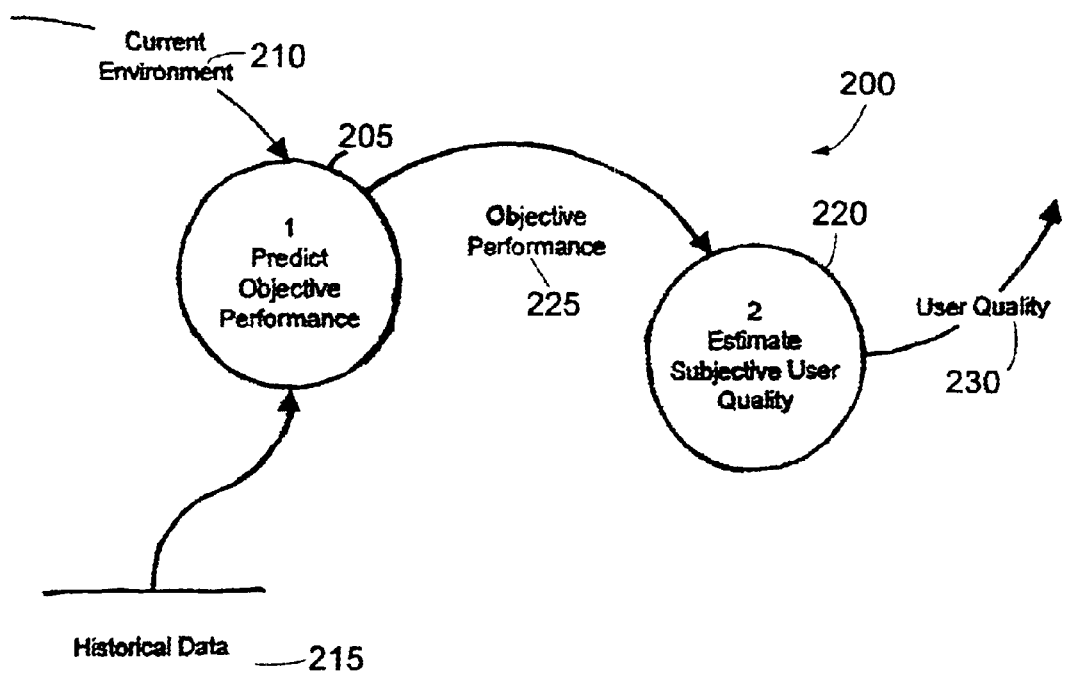
FIG. 2 is a data flow diagram illustrating primary processes for predicting quality of a distributed computer network communication in accordance with an exemplary embodiment of the present invention.

FIG. 2 is a process diagram illustrating an exemplary prediction system 200 comprising software-implemented processes for execution within Internet telephony gateways or in an external system that provides prediction results to Internet telephony gateways. A first process 205, also described as an objective performance prediction process, combines knowledge of the current Internet environment 210 with historical data 215 from previous communications. This software-implemented process uses those inputs to predict objective performance characteristics 225 for the potential communication. A second process 220, also described as an estimation process, accepts the objective performance characteristics 225 output by the first process 205 and generates an estimate of an expected quality of communications with an end user. With the user quality estimate 230, which is output by the software-implemented process 220, Internet telephony gateways, such as the gateways 16 and 20 of FIG. 1, can decide whether to proceed with the communication or rely on an alternative to computer-network supported communications.

To operate in real-time, while avoiding the addition of unacceptable delays to the initiation of the communication, the prediction system 200 preferably completes the user quality estimate 230 in less than 1 second. Because expected applications of the prediction system 200 typically include not only estimating quality for a specific communication, but also selecting from among several potential communications, the system 200 is preferably capable of parallel computation. In a parallel computer implementation, the system 200 preferably selects the appropriate communication within 1 second.

The following sections and the referenced FIGS. 3–8 describe the major predictive components of the system 200 of FIG. 2, including the two software-implemented processes and their inputs and outputs.

Historical Data

For an exemplary embodiment, a store of historical data collected for the prediction system 200, such as the historical data 215 of FIG. 2, can include four major sources of information. The first information source represents inherent attributes of the communication, including the identities of the communicating endpoints, time of day and day of week for the communication, and media coding algorithm(s) used by the endpoints in each communication. The second information source represents communication-related statistics collected by the communicating parties. Assuming that the communication relies on the Real Time Protocol (RTP) for transport, those statistics can include total and fractional packet loss for each direction, which can be automatically collected. A third source of historical data comprises additional measurements made during the communication expressly for the purpose of adding to the data store. Those measurements include a characterization of the round trip delay from each endpoint and the fine-grained network path from the initiating endpoint. Finally, the historical data also can contain attributes of the Internet environment at the time of the communication and, in particular, the coarse-grained network paths from each endpoint to the other.

Table 1 lists each of the components of the historical data for a given communication denoted as i.

TABLE 1

Components of Historical Data

Attributes of Communication

| | |
|---|---|
| $p(i)$ | Identity of Initiating Endpoint |
| $q(i)$ | Identity of Terminating Endpoint |
| $D(i)$ | Day of Week |
| $t(i)$ | Time of Day |

Inherent Statistics of Communication

| | |
|---|---|
| $L_{pq}(i)$ | Total Packets Lost from Initiating Endpoint |
| $M_{pq}(i)$ | Fraction of Packets Lost from Initiating Endpoint |
| $L_{qp}(i)$ | Total Packets Lost from Terminating Endpoint |
| $M_{qp}(i)$ | Fraction of Packets Lost from Terminating Endpoint |

Additional Measurements Made During Comunication

| | |
|---|---|
| $T_{pq}(i)$ | Round Trip Delay from Initiating Endpoint (approximation of probability density function) |
| $T_{qp}(i)$ | Round Trip Delay from Terminating Endpoint (approximation of probability density function) |
| $-_{pq}(i)$ | Fine-Grained Network Path from Initiating Endpoint |

Attributes of Internet Environment at Time of Communication

| | |
|---|---|
| $-_{pq}(i)$ | Coarse-Grained Network Path from Initiating Endpoint |
| $-_{qp}(i)$ | Coarse-Grained Network Path from Terminating Endpoint |

The attributes and inherent statistics can be collected by conventional communicating systems. The additional measurements and Internet environment attributes, however, are not typically available in the prior art. The prediction system 200, therefore, can include software modules that collect such historical data components. These software modules can rely on three different communication protocols to collect Internet communication measurements and environment attributes data—the International Telecommunications Union (ITU) H.323-series protocols for multimedia communication, the Internet Control Message Protocol (ICMP), and the Border Gateway Protocol (BGP)—as described below in connection with FIGS. 3–5.

H.323 Round Trip Delay Probes

Figure 3:
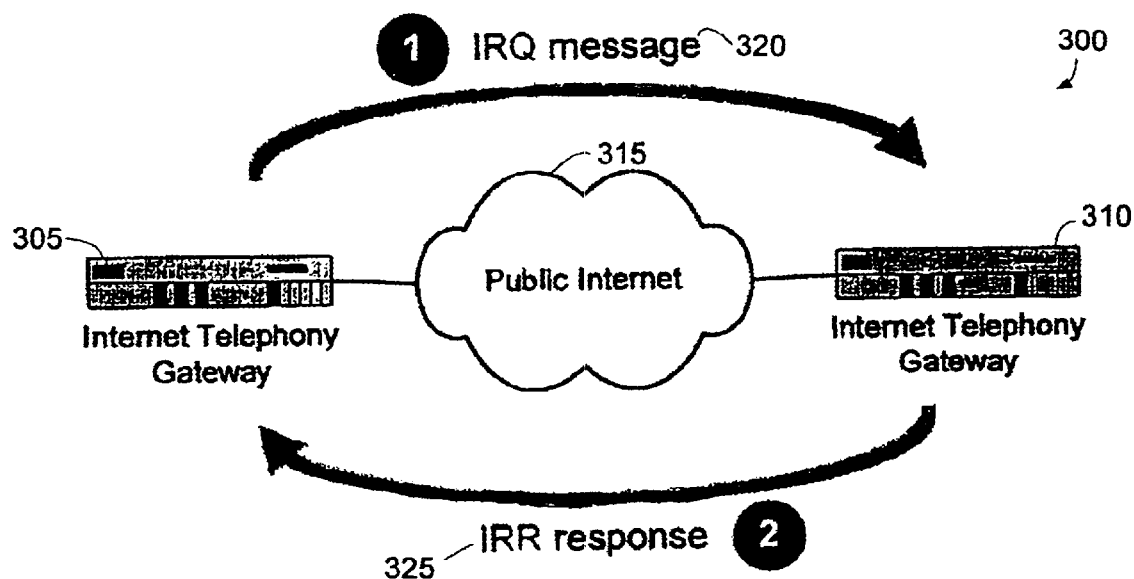
FIG. 3 is a block diagram illustrating an application of ITU-H.323 protocol-compatible roundtrip delay probes for an Internet-based telephony service system in accordance with an exemplary embodiment of the present invention.

FIG. 3 illustrates the protocol exchange between endpoints, typically implemented by Internet telephony gateways compatible with ITU H.323 protocols, which define standards for multimedia communications across the Internet. The ITU H.323 protocols include options that permit a direct measure of a round-trip time between communicating endpoints of a computer network-implemented communications system. As shown by the block diagram in FIG. 3, this data collection option is implemented by an H.323-compatible system 300 that uses an Information Request (IRQ) message 320. Either endpoint 305 or 310, also described as Internet telephony gateways, can send the IRQ message 320 to the other via the Internet 315. When the receiving endpoint receives the IRQ message 320, it can return an Information Reply (IRR) response 325 in accordance with the ITU H.323 protocol. The time between sending the IRQ message 320 and receiving the corresponding IRR response 325 represents one sample of round trip delay for the communication between the endpoints 305 and 310.

Internet Control Message Protocol Path Probes

Figure 4:
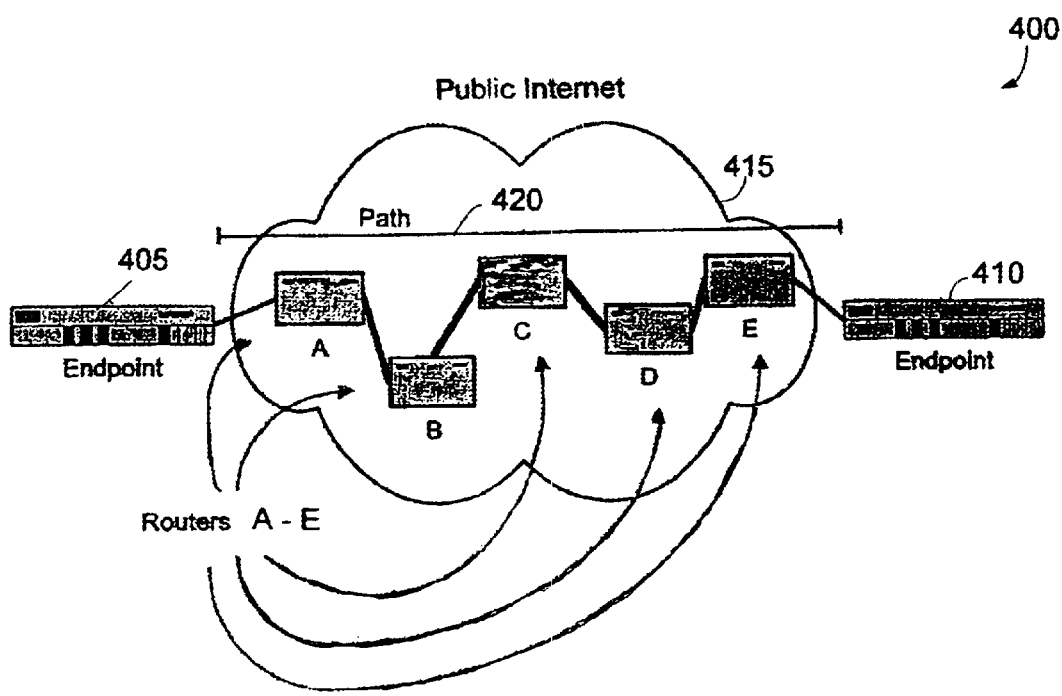
FIG. 4 is a block diagram illustrating an application of an ICMP probe for measuring characteristics of a fine-grain computer network path in accordance with an exemplary embodiment of the present invention.

The Internet Control Message Protocol (ICMP), a standard component required for all present systems on the Internet, can provide a mechanism to discover the fine-grained path between two devices on the Internet. FIG. 4 is a block diagram that illustrates an ICMP-based system for measuring the characteristics of a network path between Internet devices. Referring to FIG. 4, an ICMP-based probe system 400 can locate intermediate routers A–E in a path 420 between endpoints 405 and 410 of the Internet 415. The probe system 400 is an active measurement mechanism because the initiating system must send a series of messages into the Internet 415 and wait for responses. The request/response exchange typically requires several seconds (frequently minutes) to complete. The traceroute (on UNIX systems) and tracert (on Microsoft Corporation's "WINDOWS 95" and "WINDOWS NT" operating systems) commands use this active measurement method. As FIG. 4 shows, the probe system 400 can discover individual devices along a communications path formed by distributed computer components, such as the path 420 formed by the networked routers A–E. An ICMP-based measurement is considered, therefore, a fine-grained measure of a network path.

Border Gateway Protocol Peering

Figure 5:
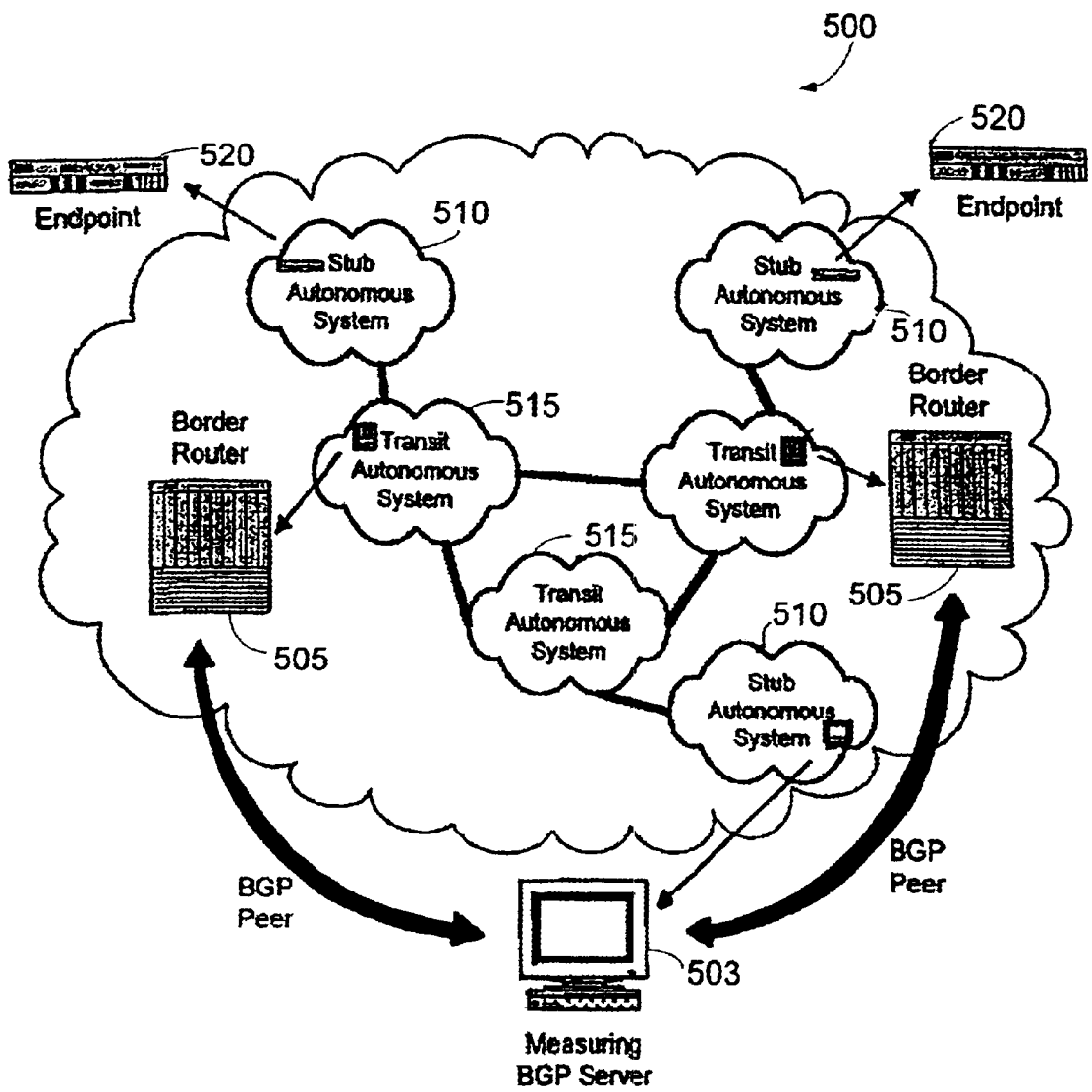
FIG. 5 is a block diagram illustrating an application of a BGP peer measurement system for measuring course-grained computer network paths in accordance with an exemplary embodiment of the present invention.

The Border Gateway Protocol (BGP) can determine coarse-grained paths between Internet Service Providers. Unlike the ICMP-based probe system 400 described above with respect to FIG. 4, BGP describes network paths using Autonomous Systems (ASs). FIG. 5 is a block diagram that illustrates the components of a BGP-compatible system for measuring coarse-grained network paths. The BGP-compatible system 500 comprises a collection of routers 505, stub autonomous systems 510 and transit autonomous systems 515 connected between of endpoints 520 and under the control of a single administrative authority. Major Internet Service Providers, for example, are often a single autonomous system. Because BGP paths do not include individual devices, they are considered coarse-grained measures of network paths. BGP peering differs from ICMP probes because BGP peering is a passive technique, rather than an active technique. In other words, no explicit action is required to measure a BGP path. Instead, a measuring BGP server 503, which is responsible for making the BGP measurement, need only remain in contact with BGP peers on the Internet. As the Internet topology changes, this measuring system is automatically informed of those changes.

Current Environment Data

While historical data provides information about previous communications, the current environment represents a specific communication under consideration. Information for that potential communication includes the identities of the endpoints, the current time and date, the coarse-grained paths between the endpoints, and a single sample of round trip delay from the initiating endpoint. The fine and coarse-grained path measurement systems described above can be used to support the collection of current environment data. Table 2 lists the elements of a current communication, where the index i represents a current call carried by distributed computer network components connected between a pair of endpoints.

TABLE 2

Current Environment

| | |
|---|---|
| p(i) | Identity of Initiating Endpoint |
| q(i) | Identity of Terminating Endpoint |
| D(i) | Day of Week |
| t(i) | Time of Day |
| $-_{pq}(i)$ | Round Trip Delay from Initiating Endpoint (single sample) |
| $-_{pq}(i)$ | Coarse-Grained Network Path from Initiating Endpoint |
| $-_{qp}(i)$ | Coarse-Grained Network Path from Terminating Endpoint |

Objective Performance Prediction Process

An important intermediate step in predicting the quality of communications is a prediction of the objective performance metrics for that communication. The objective performance prediction can include four primary characteristics—the packet loss in each direction and the round trip delay in each direction, as identified in Table 3. The round trip delay is an approximation of the probability density function (pdf) for the quantity, as round trip delay is a continuous-time random variable.

TABLE 3

Objective Performance Metrics

| | |
|---|---|
| $M_{pq}(i)$ | Fraction of Packets Lost from Initiating Endpoint |
| $M_{qp}(i)$ | Fraction of Packets Lost from Terminating Endpoint |
| $T_{pq}(i)$ | Round Trip Delay from Initiating Endpoint (approximation of probability density function) |
| $T_{qp}(i)$ | Round Trip Delay from Terminating Endpoint (approximation of probability density function) |

A prediction function, represented in FIG. 2 as the objective performance prediction process 205, accepts historical data and current environment data as inputs and provides an estimation of the objective performance. The most difficult problem facing this function is the amount of data available as input. Historical data is expected to be available for hundreds of millions of communications, yet only a small number of those past communications will be relevant for the current case.

Figure 6:
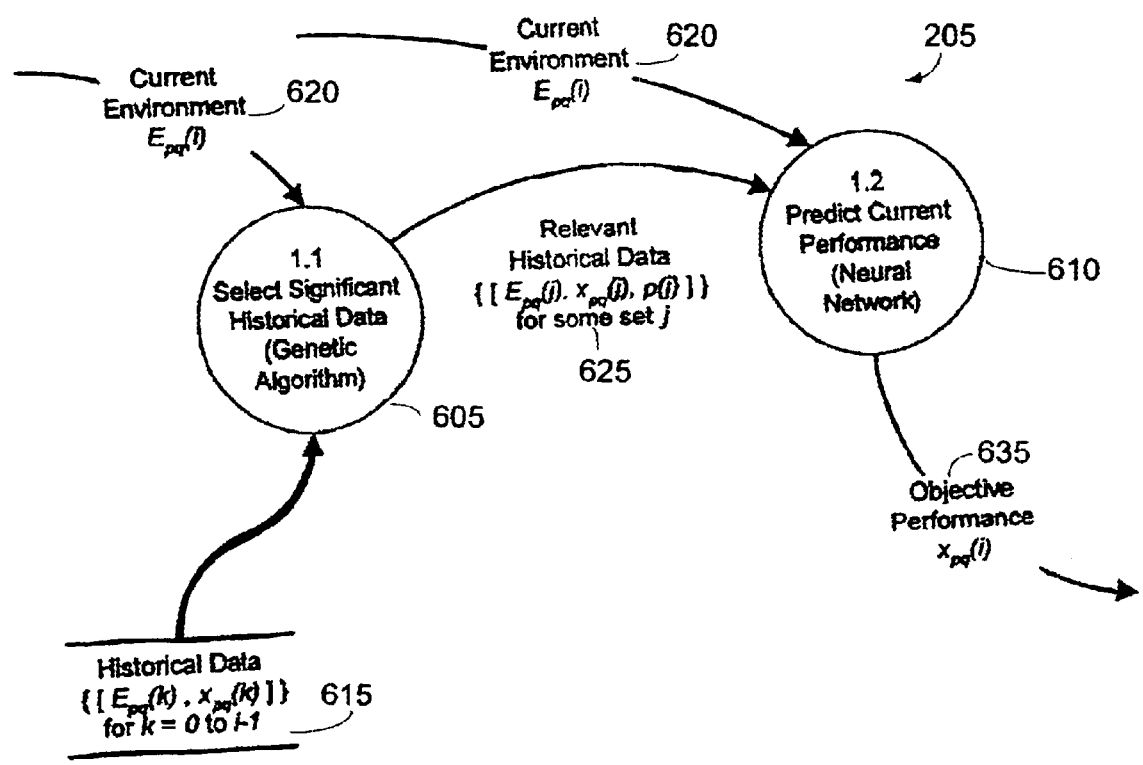
FIG. 6 is a data flow diagram illustrating the prediction of objective performance in accordance with an exemplary embodiment of the present invention.

To efficiently process both historical data and current environment data, the objective performance prediction process 205 can be implemented by a genetic algorithm for selecting significant historical data and a neural network for predicting current performance. FIG. 6 is a data flow diagram illustrating a two-stage process for predicting objective performance. Turning now to FIG. 6, the objective performance prediction process 205 preferably comprises a genetic algorithm 605 and a neural network 610. The genetic algorithm 605 is operative to select significant historical data for communication services, whereas the neural network 610 can predict current performance of communication services. The genetic algorithm 605 accepts historical data 615 and current environment data 620 and, in response, outputs relevant historical data 625. The neural network 610 can accept current environment data 620 and relevant historical data 625 and, in response, generates a prediction of objective performance 635.

Input data for the objective performance prediction function 205 can be divided into two parts, historical data 615 and current environment data 620. A particular communication i consists of a conditioning event $E_{pq}(i)$ on the random variable representing the desired output performance $x_{pq}(i)$, as shown by Equations 1 and 2.

$$E_{pq}(i) = \{p(i), q(i), D(i), t(i), -_{pq}(i), -_{pq}(i), -_{qp}(i)\} \quad \text{Equation 1}$$

$$x_{pq}(i) = \{M_{pq}(i), M_{qp}(i), T_{pq}(i), T_{qp}(i)\} \quad \text{Equation 2}$$

Genetic Algorithm

The first stage of the objective performance prediction process 205, the genetic algorithm 605, selects significant historical data by extracting from historical data 615 those pairs $E_{pq}$ and $x_{pq}$ that are most relevant to the current communication. It also computes a correlation vector for each pair. This correlation vector serves to weight the extracted historical data appropriately. The genetic algorithm 605 is preferably implemented by a genetic algorithm performing a feature selection. The genetic algorithm 605 can be tuned to select the historical data 615 based on the criteria listed in Table 4.

TABLE 4

Selection Criteria

Similarity of Network Paths. When the proposed communication i has a significant portion of its network path in common with a historical communication j, the historical data is more relevant.

TABLE 4-continued

Selection Criteria

Identity of Endpoints. When either or both of the endpoints of the proposed communication are the same as a historical communication, the historical data is more relevant.
Time and Date. Communications that took place at the same time of day and/or day of week are more relevant to the current communication.

Historical data 615 also can be used to evolve the genetic algorithm 605 so as to optimize the relative weights of these factors in calculating the correlation vector.

Neural Network

Figure 7:
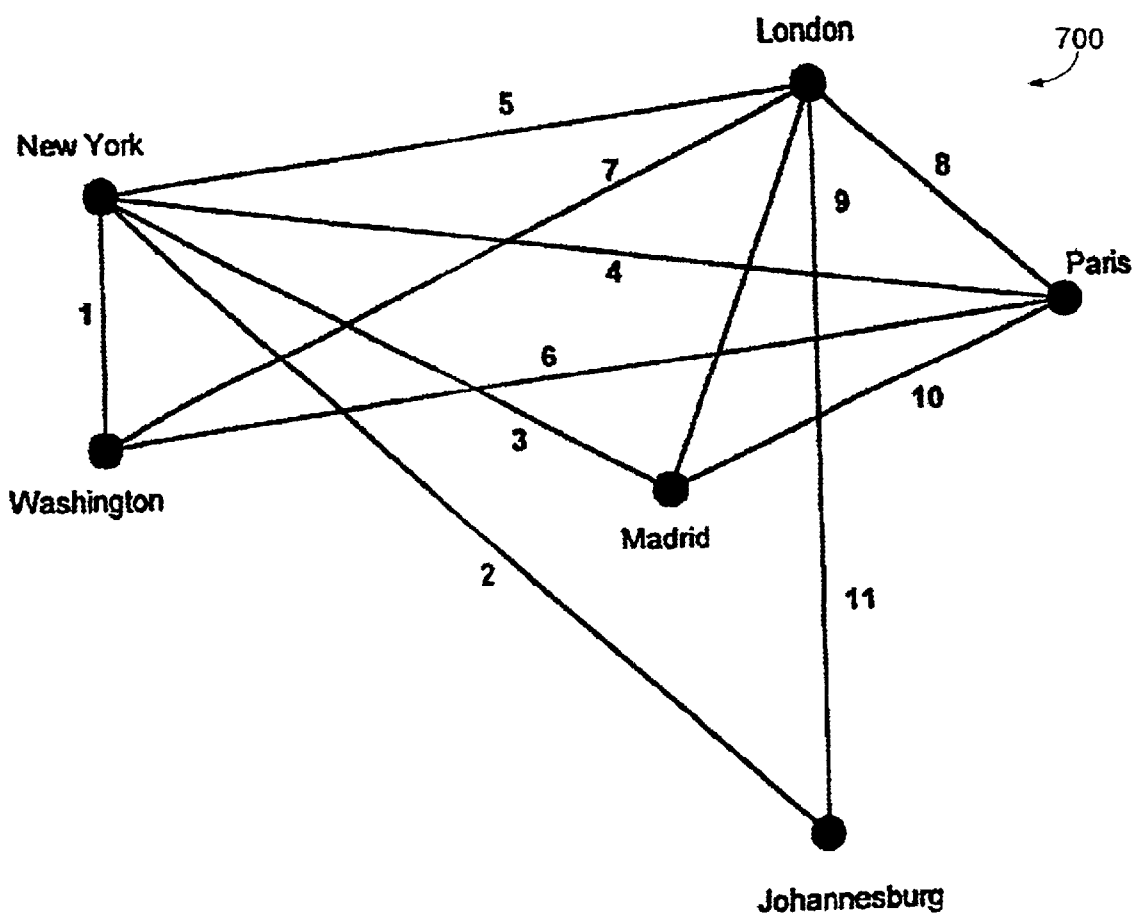
FIG. 7 is a diagram illustrating a representative example of a distributed communications network and paths connecting pairs of endpoints of this network.

A second stage of the objective performance prediction process 205, the neural network 610, preferably relies on an optimal interpolative neural network to predict current performance. The operation of such a neural network is best described by a simple example of a representative universe comprising six endpoint devices, located in New York, Washington D.C., Johannesburg, Madrid, Paris, and London. A sample network 700 of communication endpoint end pairs is shown in FIG. 7. The numbers in FIG. 7 are merely labels for the communicating pairs; they do not represent distance or any other numerical value.

For the example, a long period consisting of several months is divided into epochs; each epoch consists of a week. The pattern of communication behavior from one week to the next is assumed to be similar. An epoch is divided into 168 hour-long slots and these slots are indexed from 1 to 168. Every communication is assigned an index corresponding to its position within the week.

For the example, the value, within slot n, of the fraction of packet loss from New York to Paris can be predicted. This scalar value is denoted as $M^4(n)$, where the communication pair 4 represents New York and Paris in FIG. 7. Let $M^1(n)$, $M^2(n)$, ..., $M^{11}(n)$ denote this variable corresponding to the other pairs of endpoint devices for FIG. 7. Because of overlaps of physical paths and overlap with respect to user interests, an assumption is made that there is correlation between pairs of the preceding variables within a given slot n. The values of this correlation can be determined by the genetic algorithm 605 of FIG. 6. For the example illustrated in FIG. 7, the values of the correlation are represented below in Table 5.

TABLE 5

Correlation Values

| | $M^1(n)$ | $M^2(n)$ | $M^3(n)$ | $M^4(n)$ | $M^5(n)$ | $M^6(n)$ | $M^7(n)$ | $M^8(n)$ | $M^9(n)$ | $M^{10}(n)$ | $M^{11}(n)$ |
|---|---|---|---|---|---|---|---|---|---|---|---|
| $M^1(n)$ | 1.00 | 0.00 | 0.00 | 0.20 | 0.30 | 0.10 | 0.20 | 0.01 | 0.00 | 0.00 | 0.00 |
| $M^2(n)$ | 0.00 | 1.00 | 0.00 | 0.00 | 0.10 | 0.00 | 0.00 | 0.00 | 0.00 | 0.00 | 0.05 |
| $M^3(n)$ | 0.00 | 0.00 | 1.00 | 0.05 | 0.05 | 0.00 | 0.00 | 0.01 | 0.01 | 0.01 | 0.00 |
| $M^4(n)$ | 0.20 | 0.00 | 0.05 | 1.00 | 0.30 | 0.30 | 0.10 | 0.20 | 0.00 | 0.05 | 0.00 |
| $M^5(n)$ | 0.30 | 0.10 | 0.05 | 0.30 | 1.00 | 0.10 | 0.30 | 0.20 | 0.05 | 0.00 | 0.10 |
| $M^6(n)$ | 0.10 | 0.00 | 0.00 | 0.30 | 0.10 | 1.00 | 0.20 | 0.20 | 0.05 | 0.00 | 0.00 |
| $M^7(n)$ | 0.20 | 0.00 | 0.00 | 0.10 | 0.30 | 0.20 | 1.00 | 0.20 | 0.05 | 0.00 | 0.00 |
| $M^8(n)$ | 0.05 | 0.00 | 0.01 | 0.20 | 0.20 | 0.20 | 0.20 | 1.00 | 0.05 | 0.00 | 0.00 |
| $M^9(n)$ | 0.00 | 0.00 | 0.01 | 0.00 | 0.05 | 0.05 | 0.05 | 0.05 | 1.00 | 0.05 | 0.00 |
| $M^{10}(n)$ | 0.00 | 0.00 | 0.01 | 0.05 | 0.00 | 0.00 | 0.00 | 0.00 | 0.05 | 1.00 | 0.00 |
| $M^{11}(n)$ | 0.00 | 0.05 | 0.00 | 0.00 | 0.10 | 0.00 | 0.00 | 0.00 | 0.00 | 0.00 | 1.00 |

From Table 5, it is clear that $M^4(n)$ is correlated to $M^1(n)$, $M^5(n)$, $M^6(n)$, $M^7(n)$, and $M^8(n)$. The correlation to other variables is zero or negligible. For simplicity of explanation, the following notation is used:

$$u(n) = M^4(n)$$

$$v(n) = \begin{pmatrix} M^1(n) \\ M^5(n) \\ M^6(n) \\ M^7(n) \\ M^8(n) \end{pmatrix}$$

$$w(n) = \begin{pmatrix} u(n) \\ v(n) \end{pmatrix}$$

A predictor of $u(n)=M^4(n)$ is constructed based on the values of $w(m)$ for the preceding two slots $m=n-1, n-2$, as well as the position of these hours (n, n−1, n−2) for the preceding days in the week (epoch). These values define the vector \_(n−1) show below in Equation 3.

$$\_(n-1)=(w(n-L) \ldots w(n-50)\ w(n-49)\ w(n-48)\ w(n-26)\ w(n-25)\ w(n-24) \ldots w(n-2)\ w(n-1)) \quad \text{Equation 3}$$

The neural network 610, therefore, can be implemented in the form $u(n)=g(\_(n-1))$.

Training data for the neural network 610 is typically based on data from the previous epochs. For the example, consider training data that is collected from the three months that precede the current epoch. This yields 12 epochs $\_^1$, $\_^2, \ldots, \_^{12}$, and their associated training pairs ($\_^j(n-1)$, $u^j(n)$) where $\_^j(n-1)$ is the vector $\_(n-1)$ corresponding to epoch $\_^j$ and $u^j(n)$ is $u(n)$ corresponding to epoch $\_^j$. The neural network 610 is preferably constructed by requiring that it send each $\_^j(n-1)$ to $u^j(n)$ for $j=1, 2, \ldots, 12$.

This requirement leads to a two-hidden layer neural network implementation. The first layer is nonlinear and contains 12 neurons corresponding to the 12 epochs. The second layer contains a single linear neuron whose output is the desired predicted value of $u(n)=M^4(n)$. The synaptic weights of the first layer are the components of the vector $\_^j(n-1)$ and the second layer weights are calculated using appropriate formulas. Accordingly, the input-output map of the neural predictor is of the form shown in Equation 4:

Equation 4:

$$M^4(n) = u(n) = g(\beta(n-1)) = \sum_{j=1}^{12} c_j \cdot e^{\beta^j(n-1)^T \cdot \beta(n-1)}$$

Figure 8:
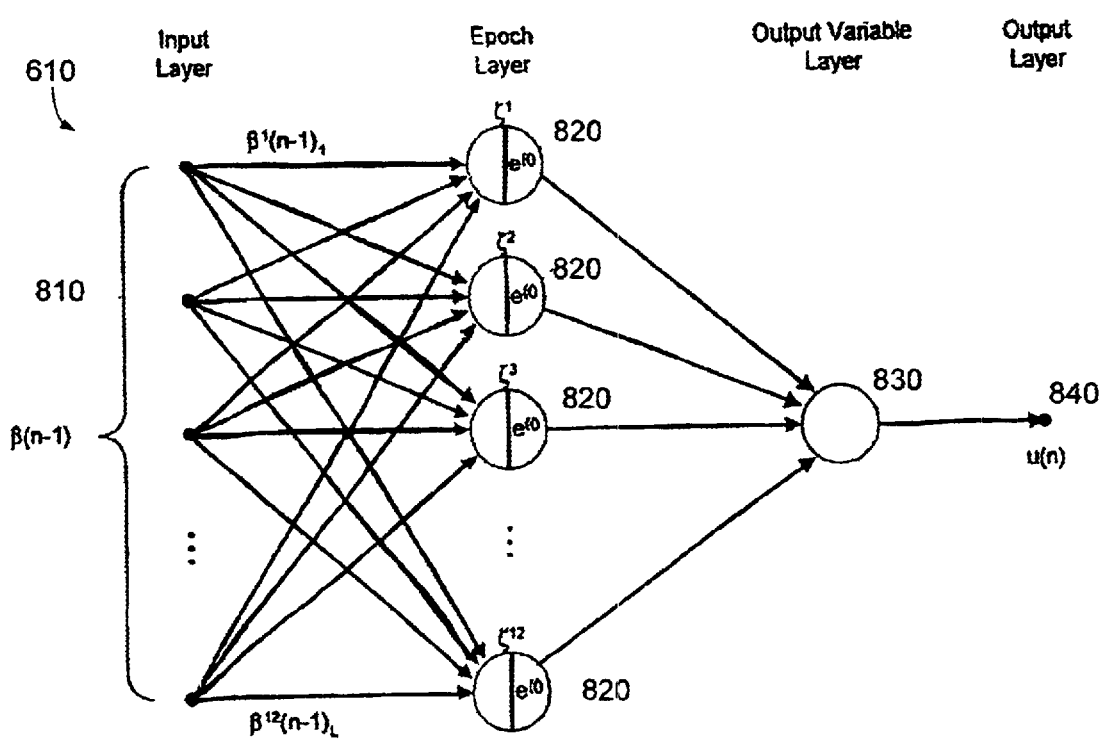
FIG. 8 is a diagram illustrating a prediction neural network constructed in accordance with an exemplary embodiment of the present invention.

FIG. 8 shows a realization of a prediction neural network, which is representative of the implementation of a second stage neural network, such as the neural network 610. The neural network 610, which can predict current performance based on both current environment and relevant historical data, comprises an input layer 810, an epoch layer 820, an output variable layer 830 and an output layer 840. The input layer 810, formed by inputs data $\beta$ (n−1), provided to each of the neurons of the epoch layer 820. The synaptic weights of the epoch layer 820 are represented by vector components of the vector $\_^j(n-1)$. The output variable layer 830 comprises a single linear neuron that accepts the outputs of the neurons forming the epoch layer 820 and, in response, generates the desired predicted value of $u(n)=M^4(n)$.

User Quality Estimate Process

Although of considerable value, the objective performance outputs of the objective performance prediction process 205 in FIG. 2 typically are not the quantities that users value in judging the subjective quality of a communication. Telecommunications research has shown that the two factors that most influence a user's perception of the quality of a telephone call are audio fidelity and latency. Together, these two qualities can be characterized through a set of calculations and algorithms known as the E-Model, documented in the ITU-T Recommendation G.107 (December 1998).

Considerable research has been devoted to predicting E-Model values based on network performance characteristics. Those efforts are described in ETSI Guide EG 201 377-1 V1.1.1. In an exemplary embodiment of the estimation process 220, an E-model characterization of predicted user quality can be constructed based on the estimation inputs described below in connection with Table 6, along with other known factors, such as the audio coding/decoding method used by communicating devices, and an application of the calculations described in ETSI Guide EG 201 377-1. The output of this exemplary estimation process 220 is an estimate of audio fidelity and latency.

Because the effect on perceived quality is subjective and not clearly delineated, the output of the objective performance prediction process 205 also can be expressed as a pair of fuzzy logic variables. Audio fidelity can be expressed using the traditional Mean Opinion Score (MOS) defined by international telecommunications standards. That standard expresses user preference as a number from 1 to 5, with 5 representing perfect fidelity and 1 representing total intelligibility. For a given system, the scores are typically obtained by playing audio samples for a large audience (individually) and asking them to rate the material they hear. Domestic telephone calls using the traditional telephone network typically receive a MOS value of 4. Subjective measures of latency are not well established in the industry; however, the same methodology used for audio fidelity can be used for latency. Specifically, latency is preferably scored on a scale from 1 to 5 using a subjective testing of a sufficiently large audience.

Estimating a subjective user quality based on an objective performance prediction, as completed by the estimation process 220 of FIG. 2, also can be completed by use of a standard neural network. For an alternative exemplary embodiment, inputs of a neural network implementation, as shown in Table 6, are the fraction of packets lost in each direction, as well as characterizations of the round trip delay. Existing research indicates that Internet delay can be accurately modeled as a shifted gamma distribution. Consistent with that research, Internet delay is characterized by the parameters of that distribution.

TABLE 6

Inputs to Estimation Function

| | |
|---|---|
| $M_{pq}(i)$ | Fraction of Packets Lost from Initiating Endpoint |
| $M_{qp}(i)$ | Fraction of Packets Lost from Terminating Endpoint |
| $T_{pq}(i)$ | Round Trip Delay from Initiating Endpoint (approximation of probability density function) |
| $T_{qp}(i)$ | Round Trip Delay from Terminating Endpoint (approximation of probability density function) |

Table 7 presents the outputs of the estimation function. For users at each of the two endpoints, this function estimates audio fidelity and latency.

TABLE 7

Outputs of Estimation Function

| | |
|---|---|
| $A_{pq}(i)$ | MOS Value for Audio Fidelity as Perceived by Terminating Endpoint User |
| $A_{qp}(i)$ | MOS Value for Audio Fidelity as Perceived by Initiating Endpoint User |
| $B_{pq}(i)$ | "MOS-like" Value for Latency as Perceived by Terminating Endpoint User |
| $B_{qp}(i)$ | "MOS-like" Value for Latency as Perceived by Initiating Endpoint User |

As shown in FIG. 2, the process 220 for generating an estimate of an expected quality of communications with an end user can be implemented by conventional neural network. The inputs to this neural network are shown in Table 6 and the outputs are shown in Table 7. The inputs defined by Table 6 represent the objective performance characteristics 225 which are input to the estimation process 220. The outputs defined by Table 7 represent the user quality estimate 230, which is output by the estimation process 220.

To generate training data for the estimation neural network, this system relies on specialized telecommunications measurement testing. Because network conditions influence different audio coding and decoding algorithms different, the network will be separately trained for each of the common coding and decoding algorithms commonly used by endpoint devices. These algorithms, known as codecs, include G.711, G.723, G.729, GSM-HR, GSM-FR, and GSM-EFR.

The present invention may be conveniently implemented in one or more program modules that are based upon and implement the features illustrated in FIGS. 2–8. No particular programming language has been described for carrying out the various procedures described above. It is considered that the operations, steps, and procedures described above and illustrated in the accompanying drawings are sufficiently disclosed to enable one of ordinary skill in the art to practice the present invention. However, there are many computers, operating systems, and application programs which may be used in practicing the present invention and, therefore, no detailed computer program could be provided which would be applicable to all of these many different systems. Each user of a particular computer will be aware of the language and tools which are most useful for that user's needs and purposes. In addition, although the invention was described in the context of certain distributed computer network protocols, a genetic algorithm, and a neural network, those skilled in the art will appreciate that the invention can be extended to other communication protocols, genetic algorithms, and neural networks.

In view of the foregoing, it would be appreciated that the present invention provides a mechanism for predicting the quality of Internet-based multimedia communications. It should be understood that the foregoing relates only to specific embodiments of the present invention, and that numerous changes may be made therein without departing from the spirit and scope of the invention as defined by the following claims.

We claim:

1. A system for generating a prediction result for quality of a multimedia communication for a distributed computer network comprising:

an objective performance prediction module, responsive to historical communication data and current communication environment data, said historical and current data being passively measured, for generating a prediction of objective performance characteristics, wherein the objective prediction module comprises:

a genetic program module, responsive to the historical communication data and the current communication environment data, for performing a feature selection by selecting relevant portions of the historical communication data, wherein the genetic program module is tuned to select the relevant portions of the historical communication data based on selection criteria comprising similarity of network communication paths, the module being also tuned to identify endpoints for the communication and time and date information for the communication; and a neural network, responsive to the current communication environment data and the relevant portions of the historical communication data, for generating the prediction of objective performance characteristics for the communication, wherein the neural network comprises an optimal interpolative neural network that generates the prediction of the objective performance characteristics, the neural network comprising:

an input layer comprising inputs $\beta(n-1)$;

an epoch layer comprising neurons, each having a synaptic weight represented by the vector component of a vector $j(n-1)$ and responsive to the inputs $\beta(n-1)$ for generating a neuron output; and an output variable layer comprising a linear neuron for generating a predicted value of $u(n)=M^4(n)$ in response to the output of each neuron on the epoch layer; and an estimation module, responsive to the prediction of objective performance characteristics, for generating an estimate of expected quality of the communication.

2. The system of claim 1, wherein the objective performance prediction module is operative to collect the historical communication data and the current communication environment data by using voice over internet protocol network signaling protocols, call detail records and usage indication messages to obtain prior communication measurements and attributes of the current communication environment.

3. The system of claim 1, wherein the objective prediction module is operative to collect the historical communication data and the current communication environment data by acquiring fine-grained path information and coarse-grained path information as indicators of the quality of service for the communication between a pair of endpoints.

4. The system of claim 1, wherein the estimation module comprises a neural network, responsive to the prediction of objective performance characteristics, for generating the estimate of expected quality of the communication.

5. The system of claim 1, wherein the estimation module generates the estimate of expected quality of the communication in response to the prediction of objective characteristics comprising a fraction packet loss for the communication, as measured from each of the endpoints for the communication, and a round-trip delay for the communication, as measured from each of the endpoints.

6. The system of claim 1, wherein the estimation module comprises a model constructed such that objective performance is correlated with an expected quality of service perceived by the end user.

7. The system of claim 1, wherein the historical communication data comprises:

attributes of the communication, comprising identities of the endpoints for the communication and time and day for the communication;

communication-related statistics comprising total packet loss and fractional packet loss for each direction of the communication;

characterizations of both the round-trip delay between the endpoints for the communication and the fine-grained network path from the endpoint responsible for initiating the communication; and characterization of the coarse-grained network path from each of the endpoints for the communication.

8. The system of claim 1, wherein the current communication environment data comprises:

attributes of the communication, comprising identities of the endpoints for the communication and time and day for the communication;

characterizations of the round-trip delay from the endpoint responsible for initiating the communication; and characterization of the coarse-grained network path from each of the endpoints for the communication.

9. A computer-implemented process for generating a prediction result for quality of a communication carried over a distributed computer network, comprising the steps:

in response to historical communication data, selecting relevant portions of the historical data based on selection criteria comprising similarity of network communication paths, identity of endpoints for the communication, and time and date information for the communication using a genetic program module;

in response to the relevant portions of historical communication data and current communication environment data, passively generating a prediction of objective performance characteristics using an optimal interpolative neural network, the neural network comprising:
an input layer comprising inputs $\beta(n-1)$;
an epoch layer comprising neurons, each having a synaptic weight represented by the vector component of a vector $j(n-1)$ and responsive to the inputs $\beta(n-1)$ for generating a neuron output; and
an output variable layer comprising a linear neuron for generating a predicted value of $u(n)=M^4(n)$ in response to the output of each neuron on the epoch layer; and
in response to the prediction of objective performance characteristics, generating an estimate of expected quality of the communication.

10. The computer-implemented process of claim 9, further comprising the step of obtaining the historical communication data by collecting a measurement of a round-trip time between communicating endpoints from communication call detail records and usage indication messages.

11. The computer-implemented process of claim 10, wherein the round trip time is defined by a time period extending between a transmission by one of the endpoints of an IRQ message and a reception of a corresponding IRR response by the endpoint.

12. The computer-implemented process of claim 9 further comprising the step of obtaining the historical communication data by using network peering data to collect coarse-grained network path information for the communication.

13. The computer-implemented method of claim 9, wherein the historical communication data comprises;
attributes of the communication, comprising identities of the endpoints for the communication and time and day for the communication;
communication-related statistics comprising total packet loss and fractional packet loss for each direction of the communication;
characterizations of both the round-trip delay between the endpoints for the communication and the fine-grained network path from the endpoint responsible for initiating the communication; and
characterization of the coarse-grained network path from each of the endpoints for the communication.

14. The computer-implemented method of claim 9, wherein the current communication environment data comprises:
attributes of the communication, comprising identities of the endpoints for the communication and time and day for the communication;
characterizations of the round-trip delay from the endpoint responsible for initiating the communication; and
characterization of the coarse-grained network path from each of the endpoints for the communication.

15. The computer-implemented method of claim 9 further comprising the step of determining whether to proceed with the communication over the distributed network based on the estimate of expected quality of the communication.

* * * * *